(No Model.) 2 Sheets—Sheet 1.

W. E. WOOD.
MECHANISM FOR CONVERTING RECIPROCATING INTO ROTARY MOTION.

No. 247,866. Patented Oct. 4, 1881.

(No Model.) 2 Sheets—Sheet 2.

W. E. WOOD.
MECHANISM FOR CONVERTING RECIPROCATING INTO ROTARY MOTION.
No. 247,866. Patented Oct. 4, 1881.

UNITED STATES PATENT OFFICE.

WINTHROP E. WOOD, OF BOSTON, MASSACHUSETTS, ASSIGNOR OF ONE-HALF TO AARON D. BLODGETT, OF SAME PLACE.

MECHANISM FOR CONVERTING RECIPROCATING INTO ROTARY MOTION.

SPECIFICATION forming part of Letters Patent No. 247,866, dated October 4, 1881.

Application filed May 11, 1881. (No model.)

*To all whom it may concern:*

Be it known that I, WINTHROP E. WOOD, of Boston, in the county of Suffolk and State of Massachusetts, have invented an Improved Mechanism for Converting Reciprocating into Rotary Motion, of which the following is a full, clear, concise, and exact description, reference being had to the accompanying drawings, making a part hereof, in which—

Figure 1:
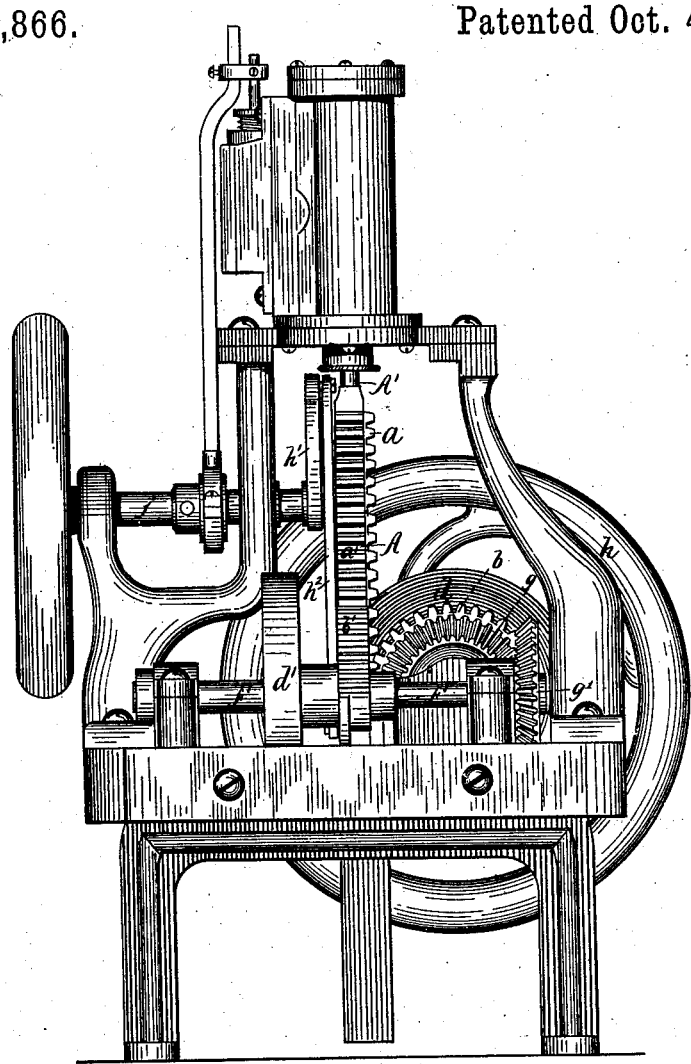
Figure 2:
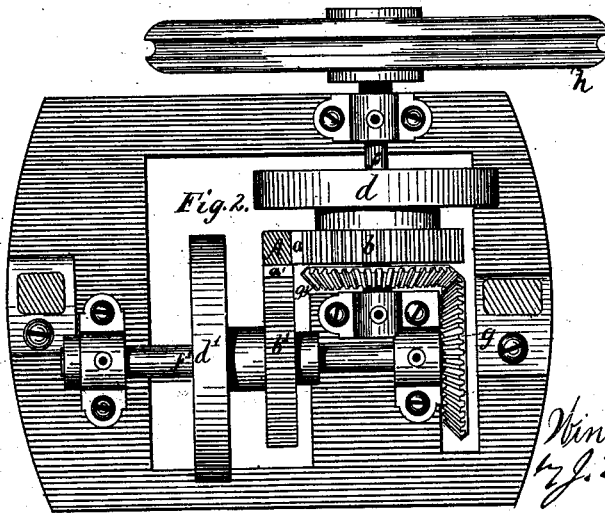
Figure 3:
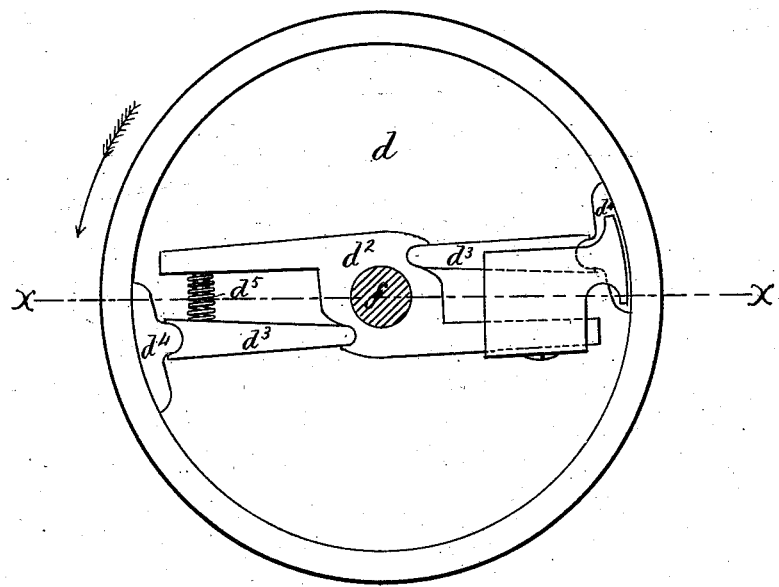

Figure 1 is a side elevation, showing my mechanism so applied to connect the piston-rod and fly-wheel of a steam-engine. Fig. 2 is a plan without the cylinder and valve mechanism shown in Fig. 1. Fig. 3 is a side elevation, and Fig. 4, a section on line $xx$, Fig. 3, illustrating the clutch mechanism.

My invention consists in the combination, with two shafts geared together, of two reciprocating racks and pinions in such a manner that the reciprocating motion of the racks and pinions impart rotary motion to the shafts, each pinion being connected to its shaft by a clutch mechanism, so that the motion of one of the pinions in one direction gives motion to its shaft, while the motion of the other pinion in the same direction is opposite to the motion of its shaft, the result being the rotary motion of both shafts, but in opposite directions.

In the drawings, A' represents the piston-rod of a steam-engine; but, as will be clear, it may represent any other reciprocating body whose motion is to be converted into a rotary motion.

Fast to piston-rod A' is the rack-bar A, carrying two racks, $a$ $a'$. The rack $a$ meshes with pinion $b$, and the rack $a'$ with pinion $b'$. The pinion $b$ is fast to one member, $d$, of a clutch mechanism, and the pinion $b'$ to one member, $d'$, of a second clutch mechanism; and these clutch mechanisms are so arranged that the member $d$ is clutched fast to its shaft $f$ during the upstroke of the rack $a$, and loose upon its shaft $f$ during the downstroke of rack $a$, while the member $d'$ is fast to its shaft $f'$ during the downstroke of rack $a'$ and loose upon its shaft during the upstroke of that rack; or, more briefly, the shaft $f$ is rotated directly by the pinion $b$ during the upstroke of the rack $a$, and shaft $f'$ rotated directly by the pinion $b'$ during the downstroke of rack $a'$; and as these two shafts $f$ $f'$ are geared together by the gears $g$ $g'$, both rotate constantly as long as racks $a$ $a'$ reciprocate.

Figure 4:
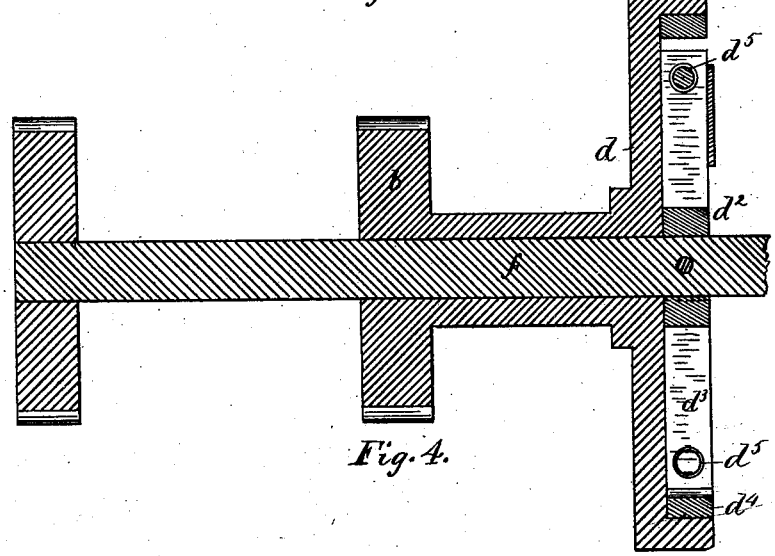

Several forms of clutch mechanism are well known which will so connect the pinions $b$ $b'$ with their shafts $f$ $f'$ that the pinion is free to move in one direction independently of the motion of the shaft, while its motion in the other direction is imparted to the shaft, and any of these mechanisms will serve; but the friction-clutch shown in detail in Figs. 3 and 4 is the best known to me. In this clutch the member $d$ is loose upon its shaft $f$, and the member $d^2$ is fast to that shaft, and these two members are connected together when wheel $d$ is moved in the direction of the arrow by means of arm $d^3$ and shoe $d^4$. The spring $d^5$ serves to press the acting surface of shoe $d^4$ against the inner surface of the rim of wheel $d$, so that when wheel $d$ moves in the direction of the arrow it will carry with it the shoe $d^4$, and consequently carry with it the arm $d^3$ and member $d^2$, which is fast to shaft $f$, the greater the resistance of shaft $f$ the greater being the pressure of shoe $d^4$ against the rim of wheel $d$; but when wheel $d$ is moved in a direction opposite to the arrow its rim slips over the outer surface of shoe $d^4$ with little friction and without noise.

It will be seen that it is not essential that the shafts $f$ $f'$ should be at right angles to each other, as shown, but that they may be parallel, the racks $a$ $a'$ being in that case back to back; or they may be arranged otherwise, provided the shafts $f$ $f'$ are rotated in opposite directions and impart motion each to the other.

The fly-wheel $h$ may be on shaft $f'$ instead of on shaft $f$; or two such wheels may be used, one on each shaft.

The shaft $j$ serves to actuate the valves of the engine, and is conveniently rotated by crank $h'$ and connecting-rod $h^2$, as shown in Fig. 1.

The operation of the engine shown in Fig. 1 is as follows: When steam is admitted above the piston the piston-rod A' is forced down, carrying with it racks $a$ $a'$, which are fast to it. The downward motion of these racks oscillate pinions $b$ $b'$ and clutch-members $d$ $d'$ in one direction, and clutch-member $d'$ carries with it its other member $d^2$ and shaft $f'$, and this motion of shaft $f'$ also turns shaft $f$, but in the opposite direction, so that during the downward stroke of the piston the shafts $f\, f'$ are both moved by rack $a'$ and clutch $d'\, d^2$, clutch-member $d$ moving in a direction opposite to the motion of its shaft $f$. During the upstroke of the piston the upward motion of racks $a\, a'$ oscillate pinions $b\, b'$ and clutch-members $d\, d'$ in the opposite direction, and clutch-member $d$ carries with it its other member $d^2$ and shaft $f$, this motion of shaft $f$ also turning shaft $f'$, but in the opposite direction from that in which shaft $f$ turns, so that during the upstroke of the piston the shafts $f\, f'$ are both moved by rack $a$ and clutch $d\, d^2$, clutch-member $d'$ moving in a direction opposite to the motion of its shaft $f'$.

What I claim as my invention is—

1. In combination, racks $a\, a'$, pinions $b\, b'$, clutch mechanisms $d\, d^2$ and $d'\, d^2$, and shafts $f\, f'$, all substantially as described.

2. In combination, wheel $d$, plate $d^2$, fast to shaft $f$, arm $d^3$, shoe $d^4$, and spring $d^5$, as set forth.

WINTHROP E. WOOD.

Witnesses:
 J. R. SNOW,
 W. A. COPELAND.